(12) United States Patent
Huang

(10) Patent No.: US 10,319,550 B2
(45) Date of Patent: Jun. 11, 2019

(54) GROUND FAULT CIRCUIT INTERRUPTER HAVING REVERSED WIRING PROTECTION FUNCTION

(71) Applicant: Wenzhou Van-sheen Electric Appliance Co., Ltd, Yueqing, Zhejiang Prov. (CN)

(72) Inventor: Jinhe Huang, Yueqing (CN)

(73) Assignee: WENZHOU VAN-SHEEN ELECTRIC APPLIANCE CO., LTD, Yueqing (CN)

( * ) Notice: Subject to any disclaimer, the term of this patent is extended or adjusted under 35 U.S.C. 154(b) by 13 days.

(21) Appl. No.: 15/692,034

(22) Filed: Aug. 31, 2017

(65) Prior Publication Data

US 2018/0061605 A1    Mar. 1, 2018

(30) Foreign Application Priority Data

Aug. 31, 2016  (CN) .......................... 2016 1 0795064

(51) Int. Cl.
*H01H 75/00*    (2006.01)
*H01H 83/04*    (2006.01)
(Continued)

(52) U.S. Cl.
CPC ........... *H01H 83/04* (2013.01); *H01R 13/652* (2013.01); *H01R 13/7135* (2013.01);
(Continued)

(58) Field of Classification Search
CPC ........ H01H 83/04; H01H 77/06; H01H 73/00; H01H 73/02; H01H 47/002; H01R 13/652;
(Continued)

(56) References Cited

U.S. PATENT DOCUMENTS 6,252,407 B1 *  6/2001  Gershen ............... G01R 31/023
                                                          324/509
7,196,886 B2 *  3/2007  Chan ...................... H02H 3/338
                                                           361/42
(Continued)

FOREIGN PATENT DOCUMENTS

| CN | 101950895 A | 1/2011 |
| CN | 104682126 A | 6/2015 |
| CN | 104269703 A | 4/2016 |

*Primary Examiner* — Shawki S Ismail
*Assistant Examiner* — Lisa N Homza
(74) *Attorney, Agent, or Firm* — Mei & Mark LLP

(57) ABSTRACT

A ground fault circuit interrupter with a reversed wiring protection function is provided. The ground fault circuit interrupter may include a main circuit switch, a middle layer bracket, a reset button, a trip coil, an electromagnetic trip mechanism, a lifting piece, a locking piece, and an elastic reset mechanism. Sides of the lifting piece may be sleeved upon live line and neutral line metal rods, respectively. Reset springs may be sleeved upon the metal rods. In a correct wiring state, an upper end of the live line metal rod may be in conductive contact with a live line movable metal sheet of the main circuit switch, and an upper end of the neutral line metal rod may be in conductive contact with a neutral line movable metal sheet of the main circuit switch, the movable metal sheets extending from the power load end.

12 Claims, 15 Drawing Sheets

(51) Int. Cl.

| | | |
|---|---|---|
| *H01R 13/652* | (2006.01) | |
| *H01R 13/713* | (2006.01) | |
| *H01R 24/78* | (2011.01) | |
| *H02H 3/33* | (2006.01) | |
| *H01H 47/00* | (2006.01) | |
| *H01H 71/04* | (2006.01) | |
| *H01R 13/641* | (2006.01) | |
| *H01R 103/00* | (2006.01) | |
| *H01R 13/447* | (2006.01) | |

(52) U.S. Cl.
CPC ............ *H01R 24/78* (2013.01); *H02H 3/338* (2013.01); *H01H 47/002* (2013.01); *H01H 2071/044* (2013.01); *H01R 13/447* (2013.01); *H01R 13/641* (2013.01); *H01R 2103/00* (2013.01)

(58) Field of Classification Search
CPC .... H01R 24/78; H01R 13/7135; H02H 3/338; H02H 3/00; H02H 3/02; H02H 3/16; H02H 3/26; H02H 5/00
USPC .............................................................. 335/6
See application file for complete search history.

(56) References Cited

U.S. PATENT DOCUMENTS

| | | | |
|---|---|---|---|
| 7,212,386 B1 * | 5/2007 | Finlay, Sr. ............. H01H 83/04 | 361/42 |
| 7,271,987 B1 * | 9/2007 | Zhang .................... H01H 83/14 | 335/18 |
| 7,439,833 B2 * | 10/2008 | Germain ................ H01H 83/04 | 335/18 |
| 7,883,346 B2 | 2/2011 | Huang | |
| 7,887,346 B1 | 2/2011 | Huang | |
| 8,147,260 B2 | 4/2012 | Huang | |
| 8,154,832 B2 | 4/2012 | Huang | |
| 8,294,028 B2 | 10/2012 | Huang | |
| 8,297,990 B2 | 10/2012 | Huang | |
| 8,299,358 B2 | 10/2012 | Huang | |
| 8,300,368 B2 | 10/2012 | Huang | |
| 8,382,497 B2 | 2/2013 | Huang | |
| 8,462,471 B2 | 6/2013 | Huang | |
| 8,472,155 B2 | 6/2013 | Huang | |
| 8,525,372 B2 | 9/2013 | Huang | |
| 8,550,829 B2 | 10/2013 | Huang | |
| 8,736,279 B2 | 5/2014 | Huang | |
| 8,760,849 B2 | 6/2014 | Huang | |
| 8,858,245 B2 | 10/2014 | Huang | |
| 9,048,559 B2 | 6/2015 | Huang | |
| 9,088,152 B2 | 7/2015 | Huang | |
| 9,203,232 B2 | 12/2015 | Huang | |
| 9,728,951 B2 | 8/2017 | Huang | |
| 2002/0071228 A1 * | 6/2002 | Campolo ............. G01R 31/041 | 361/42 |
| 2004/0021996 A1 * | 2/2004 | Wu ........................ H01H 83/04 | 361/42 |
| 2004/0070474 A1 * | 4/2004 | Wu ........................ H01H 83/04 | 335/18 |
| 2004/0070897 A1 * | 4/2004 | Wu ........................ H01H 83/04 | 361/42 |
| 2004/0141264 A1 * | 7/2004 | Germain ................ H01H 83/04 | 361/42 |
| 2004/0201438 A1 * | 10/2004 | Gao .................... H01R 13/7135 | 335/6 |
| 2005/0002137 A1 * | 1/2005 | Germain ................ H01H 83/04 | 361/42 |
| 2005/0140476 A1 * | 6/2005 | Gao ........................ H01H 83/04 | 335/18 |
| 2005/0264383 A1 * | 12/2005 | Zhang .................... H01H 83/04 | 335/18 |
| 2006/0044086 A1 * | 3/2006 | Wang ..................... H01H 83/02 | 335/18 |
| 2006/0044087 A1 * | 3/2006 | Wang ..................... H01H 83/04 | 335/18 |
| 2006/0198071 A1 * | 9/2006 | Campolo ................ H01H 71/62 | 361/72 |
| 2006/0279886 A1 * | 12/2006 | Huang ................... H01H 83/04 | 361/42 |
| 2007/0132530 A1 * | 6/2007 | Wang ..................... H01H 83/04 | 335/6 |
| 2007/0211397 A1 * | 9/2007 | Sokolow ............ H01R 13/4534 | 361/42 |
| 2007/0279162 A1 * | 12/2007 | Zhang .................... H01H 83/04 | 335/21 |
| 2008/0094765 A1 * | 4/2008 | Huang ................... H01H 83/04 | 361/42 |
| 2008/0112099 A1 * | 5/2008 | Li .......................... H01H 83/04 | 361/42 |
| 2008/0123227 A1 * | 5/2008 | Bonasia ................. H02H 3/338 | 361/49 |
| 2008/0170341 A1 * | 7/2008 | Huang ................... H01H 83/04 | 361/42 |
| 2008/0248662 A1 * | 10/2008 | Bazayev ............. H01H 9/0264 | 439/107 |
| 2009/0086389 A1 * | 4/2009 | Huang ................... H01H 83/04 | 361/42 |
| 2009/0091869 A1 * | 4/2009 | Huang ................... H01H 83/04 | 361/42 |
| 2009/0147416 A1 * | 6/2009 | Zheng ..................... H01H 83/04 | 361/42 |
| 2009/0147418 A1 * | 6/2009 | Li .......................... H01H 83/04 | 361/45 |
| 2009/0273866 A1 * | 11/2009 | Chan ....................... H02H 3/338 | 361/45 |
| 2010/0254049 A1 * | 10/2010 | Yue ........................ H01H 83/04 | 361/42 |
| 2010/0290163 A1 * | 11/2010 | Li .......................... H01H 83/04 | 361/42 |
| 2013/0021120 A1 * | 1/2013 | Chen ...................... H01H 83/04 | 361/42 |
| 2013/0038968 A1 * | 2/2013 | Chen ...................... H01H 83/04 | 361/42 |
| 2015/0280430 A1 | 10/2015 | Huang | |
| 2018/0061605 A1 * | 3/2018 | Huang ................... H01R 24/78 | |

* cited by examiner

GROUND FAULT CIRCUIT INTERRUPTER HAVING REVERSED WIRING PROTECTION FUNCTION

CROSS-REFERENCE TO RELATED APPLICATION

This application claims priority to, and incorporates herein in its entirety, Chinese Patent Application No. 201610795064.4, filed Aug. 31, 2016.

TECHNICAL FIELD

The present disclosure relates to the field of power sockets, and in particular, to a ground fault circuit interrupter with a reversed wiring protection function.

BACKGROUND

An existing ground fault circuit interrupter, for example as disclosed in Chinese Patent Application No. 201010248157.8, includes a shell, an output conductor, a power input end, a power output end, and a reset button. The reset button is used to close a main circuit switch and matches with a lock catch mechanism to keep a closed state of the main circuit switch and enable the power input end, the power output end, and the output conductor to be kept conductive. It also includes an electromagnetic trip mechanism used for disconnecting the main circuit switch when a leakage current is generated. At least two elastic metal sheets extend from the input end and the output end of the existing ground fault circuit interrupter. Each elastic metal sheet is of a certain length. One end of each elastic metal sheet is secured, and the other end of each elastic metal sheet is freely suspended. The free end of each elastic metal sheet is bent at a certain angle relative to a secured end, and movement of each elastic metal sheet is driven by a pressing or lifting action of other components to be in conductive contact with a corresponding static metal sheet. The main supply includes a neutral line and a live line.

In manufacturing, it is difficult to consistently achieve the desired degree of bending the respective elastic metal sheets. Further, it is difficult to maintain consistency in the degree of bending of left and right elastic metal sheets because the free ends repeatedly and elastically rise; strain deformation may be caused after substantial use. Indeed, such repeated elastic rise may undermine the reliability of expected conductive contact, resulting in a potential safety hazard. Additionally, manufacturing and assembly of the elastic metal sheets are relatively complex, the amount of materials required is substantial, and there is a high failure rate in manufacturing the elastic metal sheets.

Chinese Patent Application No. 201410499136.1 discloses an improved ground fault circuit interrupter. That application teaches including a movable metal sheet structure is elastically arranged with a lifting plate. The reset button drives the lifting plate to lift up the movable metal sheet structure by hooking it with the lifting plate with a lock catch. This enables an end of the movable metal sheet to be placed in conductive contact with a static contact end of its corresponding static contact metal sheet.

Such structure still has certain limitations: First, to reliability and accurately enable such lifting and closing, the manufacturing and assembly is difficult and highly technical. Second, numerous components, including a flexible wire and a transition metal must be connected in complex structure, which results in high manufacturing costs. Third, an on-off mode of lifting and closing is only accomplished by overcoming resistance of a reset spring on the reset button; this is time consuming and the spring is at risk of straining. Fourth, a locking piece of the lock catch is in a block shape and does not have a mechanism to prevent the locked piece from being disengaged.

A solution for at least some of the above-described problems is disclosed in Chinese Patent Application No. 201510036392.1. There, the disclosed ground fault circuit interrupters with a reversed wiring protection implement tripping when in reversed wiring through electric structures—including a control chip, a thyristor and the like. However, such electrical structures must be intact to operate. That is, the devices cannot effectuate reversed wiring protection if key elements, including the thyristor, are damaged. The devices lack a mechanical forced tripping function if the main circuit switch is in the closed state. Thus, such disclosed ground fault circuit interrupters also embody potential safety hazards.

SUMMARY

In the light of the above problems, the present disclosure provides a ground fault circuit interrupter with a reversed wiring protection function.

Objectives of the present disclosure are implemented through the following solutions.

A ground fault circuit interrupter with a reversed wiring protection function is provided. The ground fault circuit interrupter may include a main circuit switch, a middle layer bracket, a reset button, a trip coil, an electromagnetic trip mechanism, a lifting piece, a locking piece, and an elastic reset mechanism disposed at a tail end of the locking piece. The locking piece may be capable of vertically slipping relative to a lifting direction of the lifting piece. First and second sides of the lifting piece may be sleeved upon live line and neutral line metal rods, respectively. A lower end of the live line metal rod may be sleeved with a live line reset spring. A lower end of the neutral line metal rod may be sleeved with a neutral line reset spring.

In a correct wiring state, an upper end of the live line metal rod may be in conductive contact with a live line movable metal sheet of the main circuit switch, the live line movable metal sheet extending from a power load end. In the correct wiring state, an upper end of the neutral line metal rod may be in conductive contact with a neutral line movable metal sheet of the main circuit switch, the neutral line movable metal sheet extending from the power load end. The neutral line reset spring and a static metal sheet below the neutral line reset spring may form a normally-closed reversed wiring path switch in a trip coil circuit. In the correct wiring state, a head of the locking piece may abut against a side wall of the lifting piece.

The electromagnetic trip mechanism may include an iron core, a lock catch, and a tripper. The iron core may be provided with a drive disc. The lifting piece may be provided with a slope matched with the drive disc of the iron core.

In a reversed wiring state, the iron core may pull the lifting piece to descend through the drive disc under the action of the magnetic field of the trip coil. In the reversed wiring state, the head of the locking piece may cover a top of the lifting piece under the action of the elastic reset mechanism. In a reversed wiring state, the live line metal rod may be separated from the live line movable metal sheet and the neutral line metal rod may be separated from the neutral line movable metal sheet to disconnect a trip coil path.

In some embodiments, a limiting boss may radially extend from a position near an upper end of the live line metal rod. A transition metal sheet may extend from an output conductor. The transition metal sheet may include a bending part extending beneath the live line movable metal sheet. The bending part of the transition metal sheet may include a bending part through hole through which the upper end of the live line metal rod penetrates. The live line metal rod may maintain conductive contact with an inner edge of the bending part through hole. In the correct wiring state, the limiting boss may abut against a bottom of the bending part of the transition metal sheet. In the reversed wiring state, the live line metal rod may be in conductive contact with a static contact sheet led out from a live line end of a power input end.

In some embodiments, an insulating seat may be disposed on the static contact sheet led out from the live line end of the power input end. The insulating seat may be provided with an insulating seat through hole through which the live line metal rod penetrates. An upper end of the live line reset spring may abut against the limiting boss. A lower end of the live line reset spring may abut against the insulating seat.

In some embodiments, the ground fault circuit interrupter may further include a slippage limiting mechanism disposed between the middle layer bracket and the locking piece. The middle layer bracket may be provided with a slippage region for the locking piece to slip.

In some embodiments, the locking piece may include a notch or a through hole through to accommodate penetration of a reset button guide column and a reset button spring. The elastic reset mechanism may include a locking piece reset spring. The tail end of the locking piece may be provided with a spring positioning part for a first end of the locking piece reset spring to sleeve and position thereupon. A second end of the locking piece reset spring may abut against the middle layer bracket.

In some embodiments, the ground fault circuit interrupter may further include a test button with a test button guide column. The locking piece may include a test button through hole to accommodate penetration of the test button guide column. The test button guide column may be provided with a first-stage stage drive slope surface and a second-stage drive slope surface. The test button through hole may be provided with an unlocking slope configured to be driven by the first-stage drive slope surface to slip in when the lifting piece is in a downward and locked state so as to unlock the lifting piece. The lock catch may be provided with a lock catch through hole configured to be driven by the second-stage drive slope surface to slip and unlock the lifting piece so as to perform forced tripping.

In some embodiments, the slippage region may be a sunken region provided on a top surface of the middle layer bracket. An outer side wall of the locking piece may be provided with a plurality of limiting protrusions. The middle layer bracket may include engaging structures that receive the limiting protrusions to prevent removal of the locking piece. The slippage limiting mechanism may include the limiting protrusions and the engaging structures.

In some embodiments, the slippage region may be an open region provided on a bottom surface of the middle layer bracket. The slippage limiting mechanism may include at least one of limiting protrusions on the locking piece and a buckling plate.

In some embodiments, the ground fault circuit interrupter may further include a cover plate. The cover plate may be disposed above the locking piece. The cover plate may be provided with a first cover plate through hole or notch and a second cover plate through hole or notch to accommodate penetration of the reset button guide column and the test button guide column, respectively. The cover plate may be provided with positioning protrusions at first and second ends of the cover plate, the positioning protrusions being configured to engage with a receiving portion of the middle layer bracket to align and lock in the cover plate with respect to the middle layer bracket.

In some embodiments, the lock catch may penetrate through the tripper. The trip coil may have a trip coil skeleton with a positioning part. The tripper may be disposed on the trip coil skeleton. A U-shaped hole may be formed in the lock catch. An arc-shaped region of the U-shaped hole may be configured to engage with the second-stage drive slope surface of the test button guide column. A lock catch spring positioning part may be arranged on a side of the U-shaped hole through which the lock catch penetrates the tripper. A first end of a lock catch spring may abut against the lock catch spring positioning part. A second end of the lock catch spring may abut against the positioning part of the trip coil skeleton.

In some embodiments, a side edge of the lock catch may be provided with a limiting notch. The trip coil skeleton may be provided with a limiting column configured to engage with the limiting notch.

In some embodiments, a pair of auxiliary tripping devices may be disposed above the live line and neutral line movable contact sheets, respectively. Each of the pair of auxiliary tripping device may be provided with a limiting step and may be sleeved with an auxiliary tripping spring. A lower end of the auxiliary tripping springs may abut against the limiting steps, respectively. The middle layer bracket may include a pair of positioning through holes, each positioning through hole including a step. The pair of auxiliary tripping devices and the auxiliary tripping springs may be disposed into the pair of positioning through holes.

Beneficial effects of embodiments of the present disclosure include the following: an action mechanism of the main circuit switch is reasonable and ingenious in structure, rapid in response, and smooth and reliable in action without being driven by the lifting piece. When in a reversed wiring state, the lifting piece may be driven by the iron core to descend and automatically trip, and the locking piece may automatically lock the lifting piece, so that the reset button cannot reset. Consequently, the main circuit switch cannot be closed, ensuring safety. Ultimately, the locking piece of the lock catch is reasonable in structure, stable and reliable in action, and convenient and rapid in assembly.

BRIEF DESCRIPTION OF THE DRAWING

FIG. 8 is a schematic structural diagram of matching of a live line metal rod of a lifting piece, a live line end of the power input end, a live line end of the power load end, a live line output conductor and the like; and FIG. 9 is a schematic structural diagram of matching of a neutral line metal rod of the lifting piece, the live line end of the power input end, a neutral line end of the power load end, a neutral line output conductor, and the like.

DETAILED DESCRIPTION OF THE EMBODIMENTS

In the following, the present disclosure is further described with reference to specific embodiments and accompanying drawings.

Embodiment I

Referring to FIGS. 1, 2, 3A, and 4-9, a ground fault circuit interrupter with a reversed wiring protection function of the present disclosure includes a main circuit switch (L10, L40), (L30, L40), (N10, N40), (N30, N40); a middle layer bracket 4, a reset button 001, a trip coil 7, and an electromagnetic trip mechanism. It further includes a lifting piece 9.

Figure 4A:
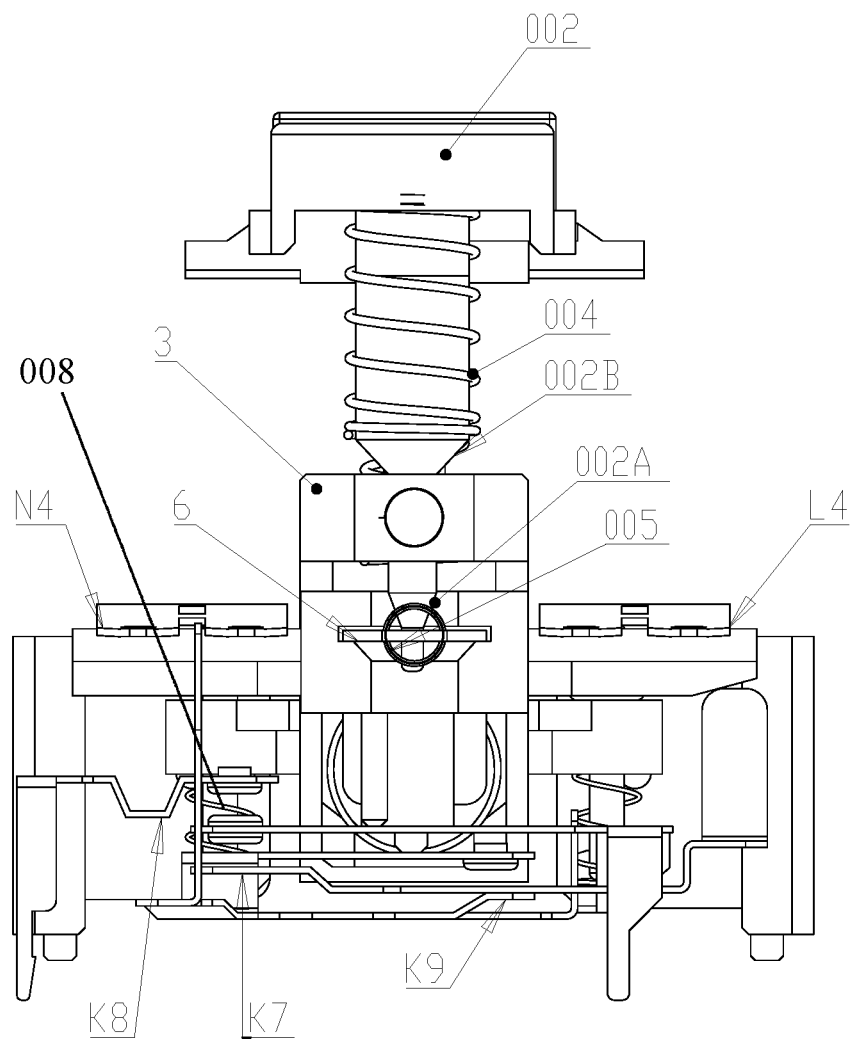
FIG. 4A is a sectional view of a delivery state.
Figure 4B:
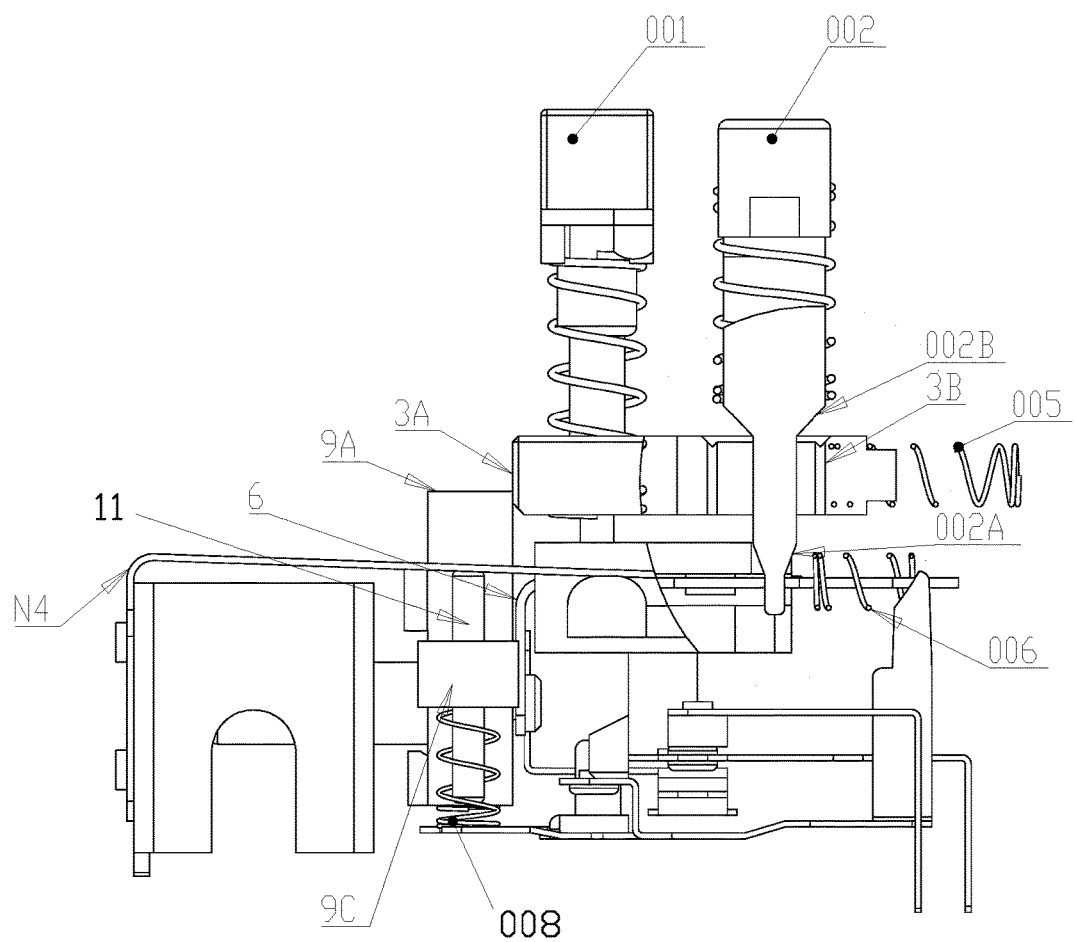
FIG. 4B is a sectional view of the delivery state in an another direction.

Two sides 9C of lifting piece 9 are respectively sleeved upon metal rods 10 and 11. Lower ends of the metal rods 10 and 11 are sleeved with reset springs 007 and 008, and upper ends of the metal rods are in conductive contact with movable metal sheets (N4, L4) of the main circuit switch in a correct wiring state. The neutral line reset spring 008 of the neutral line metal rod 11 and a static metal sheet K9 below the neutral line reset spring 008 of the neutral line metal rod form a normally-closed reversed wiring path switch in a trip coil 7 circuit. Upper ends of the neutral line metal rod 11 and the live line metal rod 10 keep conductive contact with the power output movable metal sheets N4 and L4 extending from the power load end when in the correct wiring state. The lifting piece 9 is provided with a locking piece 3 capable of vertically slipping relative to a lifting direction of lifting piece 9 in a corresponding manner. An elastic reset mechanism is arranged at a tail end of the locking piece 3. As depicted in FIG. 4B, a head 3A of the locking piece abuts against a side of top 9A of the lifting piece 9 in the correct wiring state.

Figure 5A:
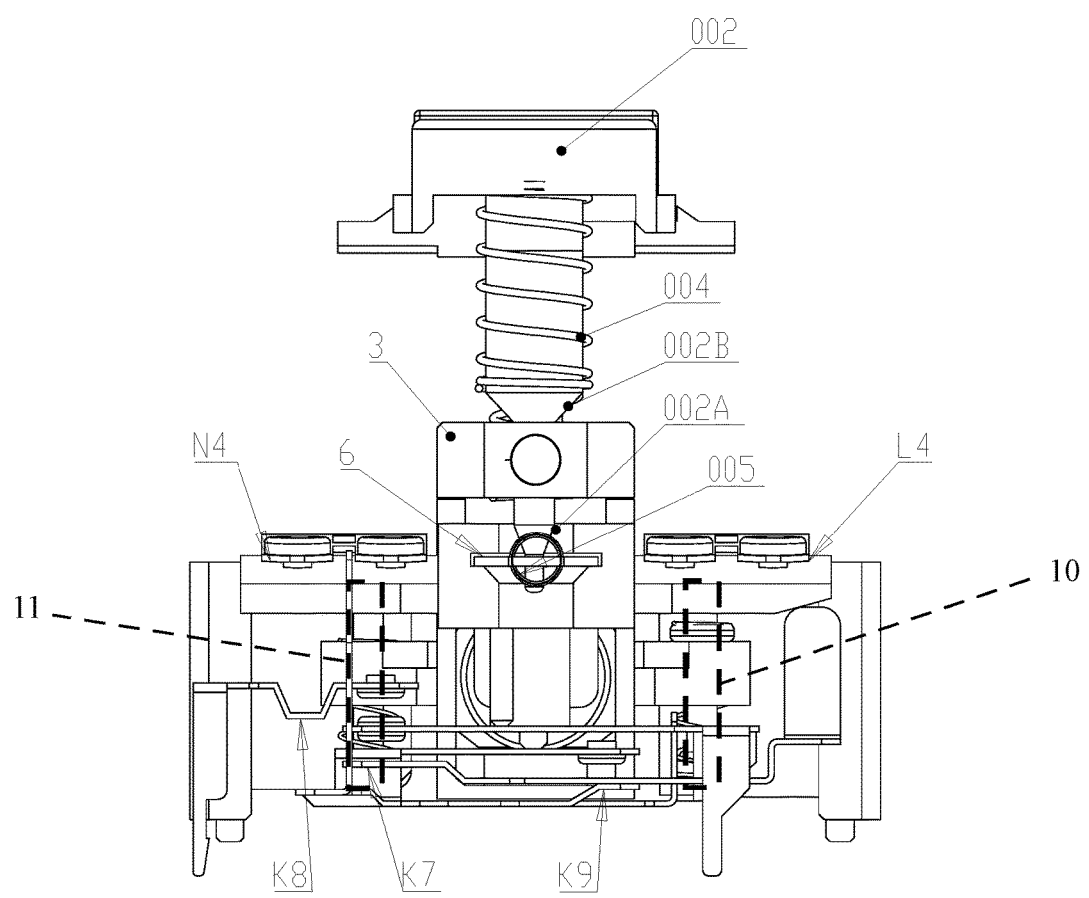
FIG. 5A is a sectional view of a reversed wiring state.
Figure 5B:
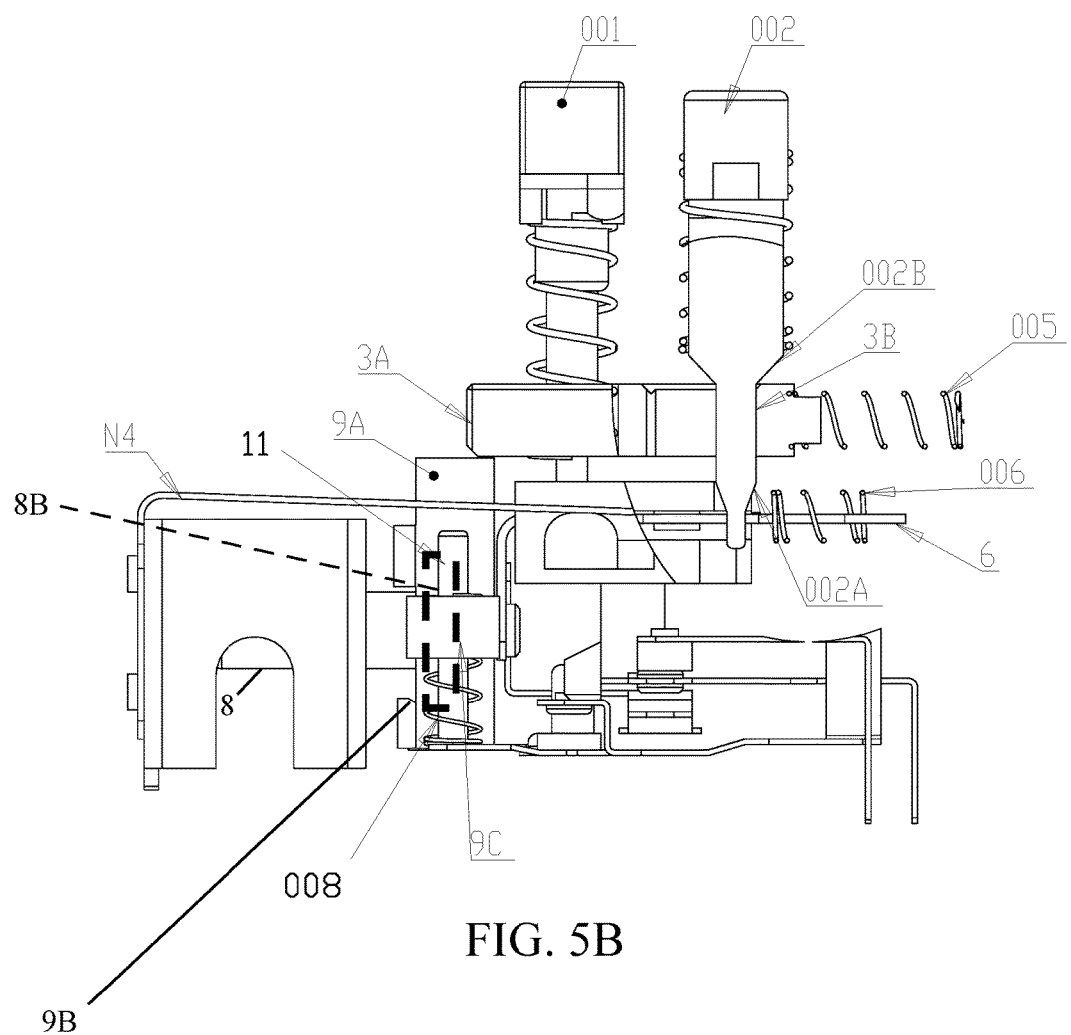
FIG. 5B is a sectional view of the reversed wiring state viewed from another direction.
Figure 6A:
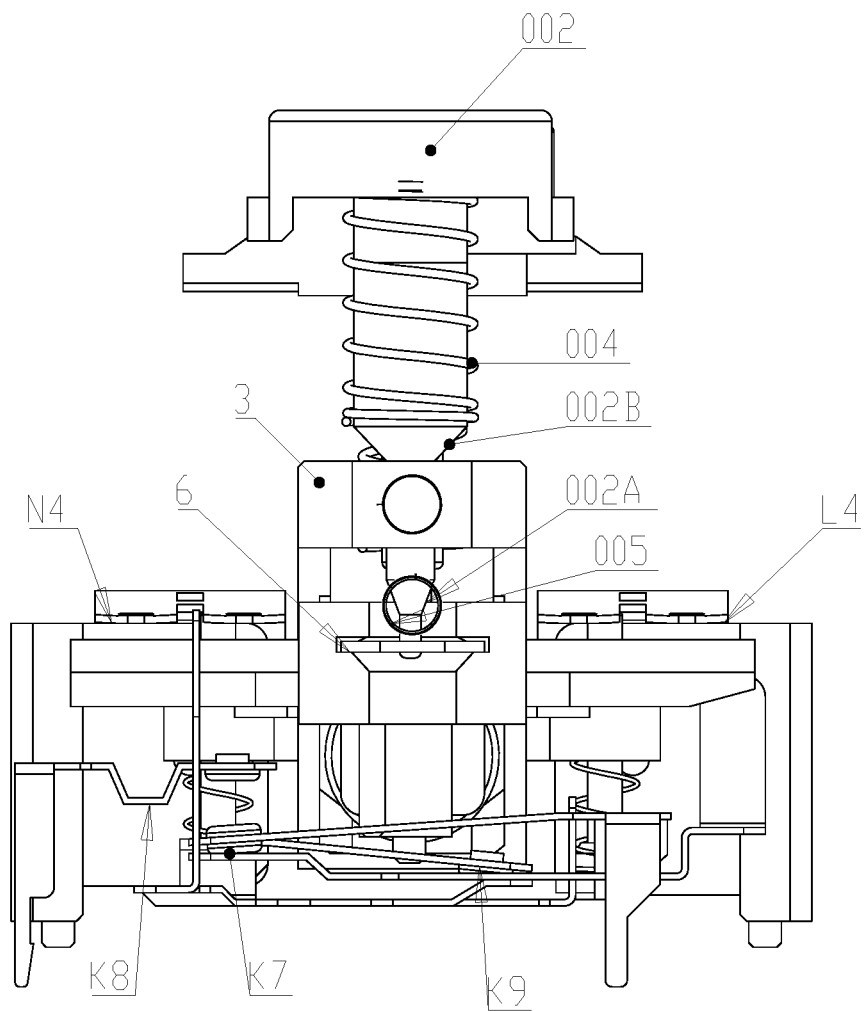
FIG. 6A is a sectional view of a pressing state of a reset button.
Figure 6B:
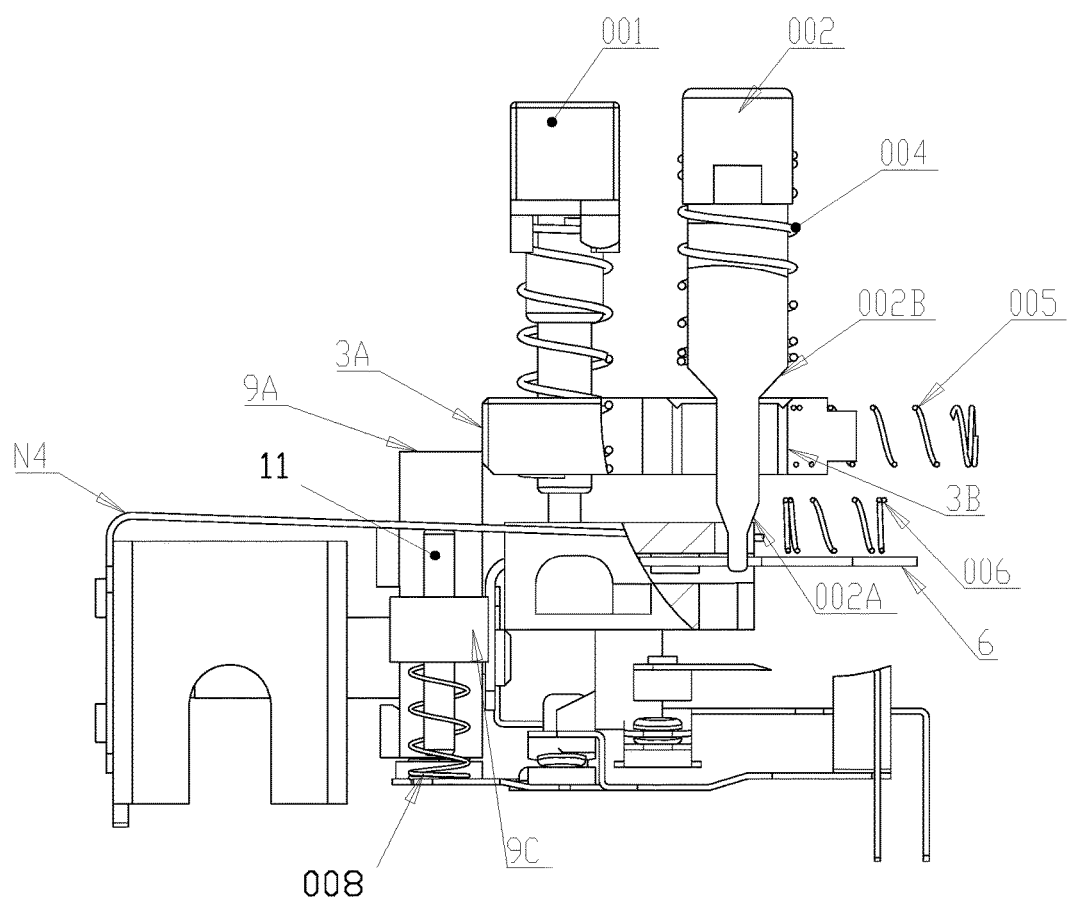
FIG. 6B is a sectional view of a pressing state of the reset button viewed from another direction.
Figure 7A:
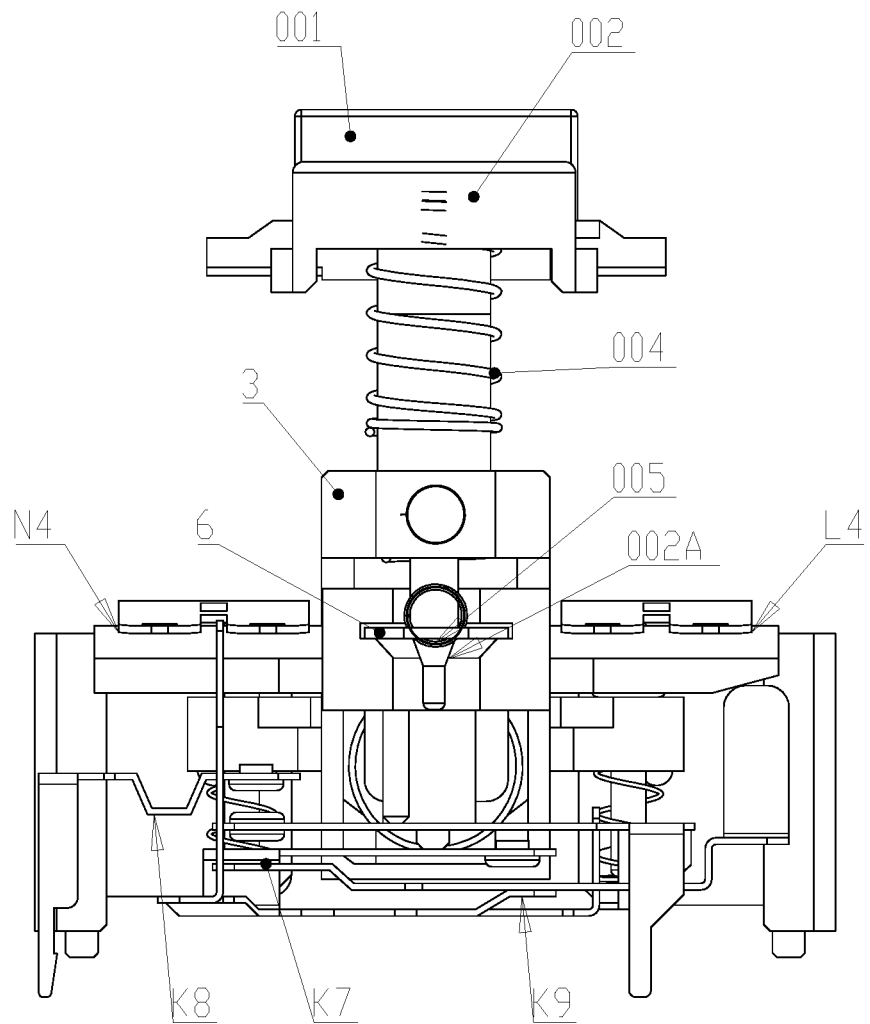
FIG. 7A is a sectional view of a forced tripping state.
Figure 7B:
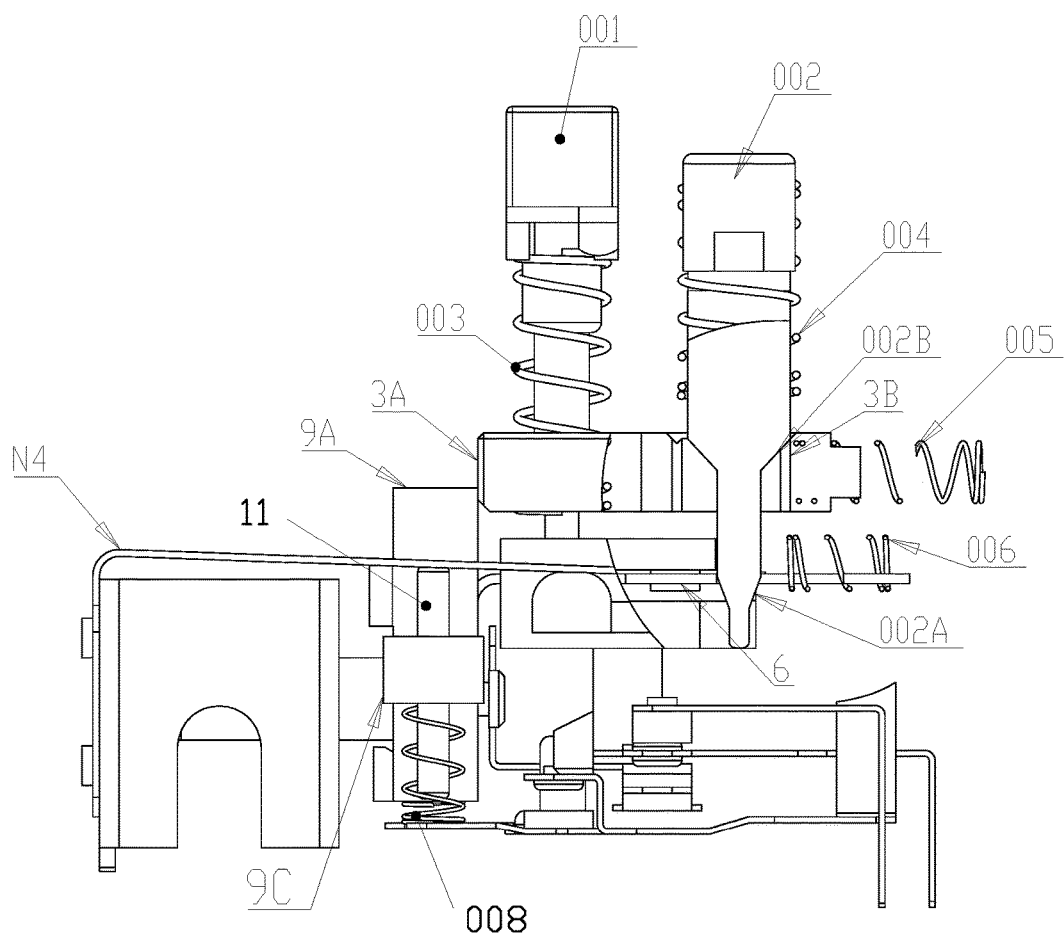
FIG. 7B is a sectional view of the forced tripping state viewed from another direction.

The electromagnetic trip mechanism includes an iron core 8, a lock catch 6, and a tripper 5. The iron core 8 is provided with a drive disc 8B, and the lifting piece 9 is provided with a slope 9B matched with the drive disc 8B of iron core 8. The iron core 8 pulls lifting piece 9 to descend through the drive disc 8B under the action of the magnetic field of the trip coil 7 when in reversed wiring. As can be seen in FIG. 5B, the head of the lock catch 6 covers a top 9A of the lifting piece 9 under the action of the elastic reset mechanism. The metal rods 10 and 11 of the lifting piece 9 are separated from the movable metal sheets L4 and N4 of the main circuit switch to disconnect a trip coil path. The movable metal sheets L4 and N4 of the main circuit switch are led out from the live line and neutral line power load ends L5, N5, respectively.

A limiting boss 10A radially extends from a position near a top of the live line metal rod 10 of the lifting piece 9.

Figure 8:
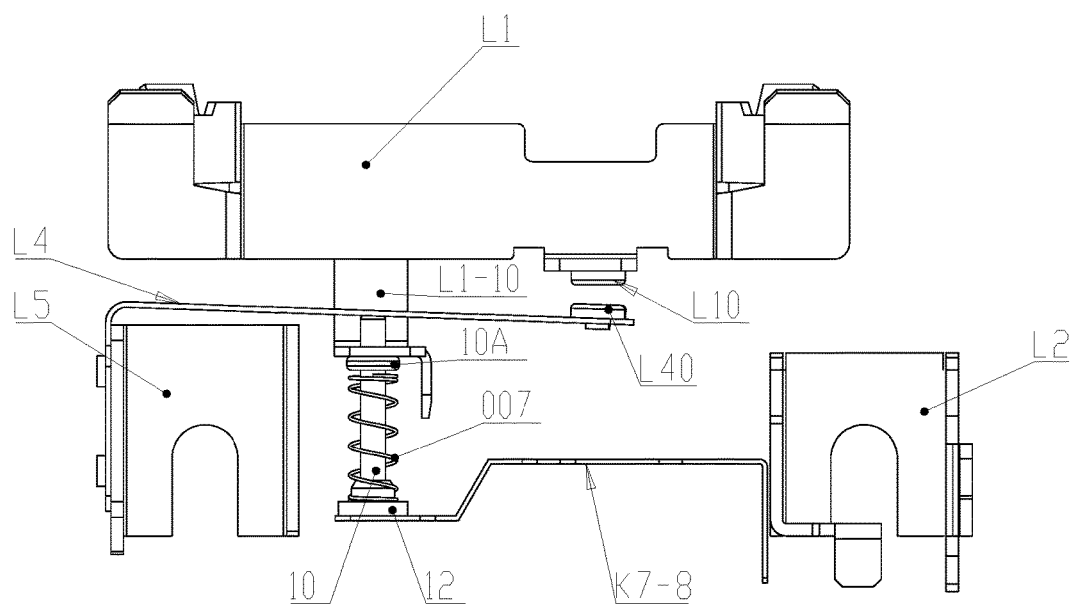
Figure 9:
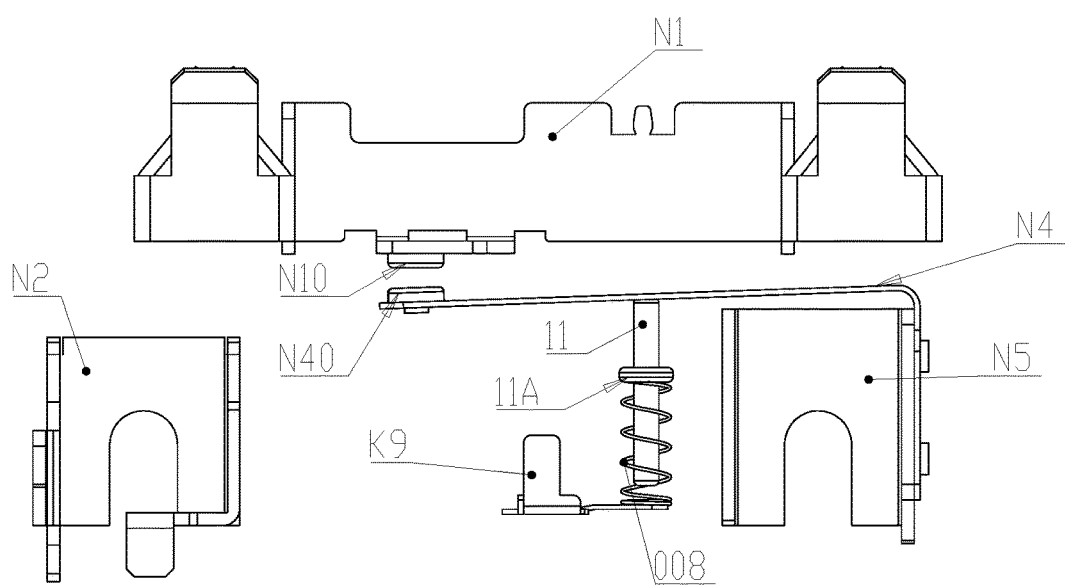

With reference to FIG. 8, a transition metal sheet L1-10 extends from an output conductor L1. The transition metal sheet L1-10 is provided with a bending part extending beneath the live line movable metal sheet L4 of the main circuit switch. The bending part of the transition metal sheet L1-10 is provided with a through hole through which the upper end of the live line metal rod 10 of the lifting piece 9 penetrates. Those skilled in the art would understand that the transition metal sheet L1-10 may also be positioned above the insulation seat 12 so that the bending part of the transition metal sheet L1-10 is provided with a through hole through which the lower end of the live line metal rod 10 of the lifting piece 9 penetrates. The live line metal rod 10 of the lifting piece 9 keeps conductive contact with an inner edge of the through hole of the bending part of the transition metal sheet L1-10. The limiting boss 10A of the live line metal rod 10 of the lifting piece 9 abuts against a bottom of the bending part of the transition metal sheet in the correct wiring state, and meanwhile a top end of the metal rod is in conductive contact with an output live line movable metal sheet L4. When in reversed wiring, the live line metal rod 10 of the lifting piece 9 descends so as to be separated from the live line movable metal sheet L4 of the main circuit switch and is in conductive contact with a static contact sheet K7-8 led out from a live line end of a power input end L2.

An insulation seat 12 is arranged on the static contact sheet K7-8 led out from the live line end L2 of the power input end. The insulation seat 12 is provided with a through hole 120 through which the live line metal rod 10 of the lifting piece 9 penetrates. An upper end of the live line reset spring 007 sleeved on the live line metal rod 10 of the lifting piece 9 abuts against the limiting boss 10A of the live line metal rod 10 of the lifting piece 9, whereas a lower end of the live line reset spring 007 abuts against the insulation seat 12 of the static contact sheet K7-8.

Figure 1:
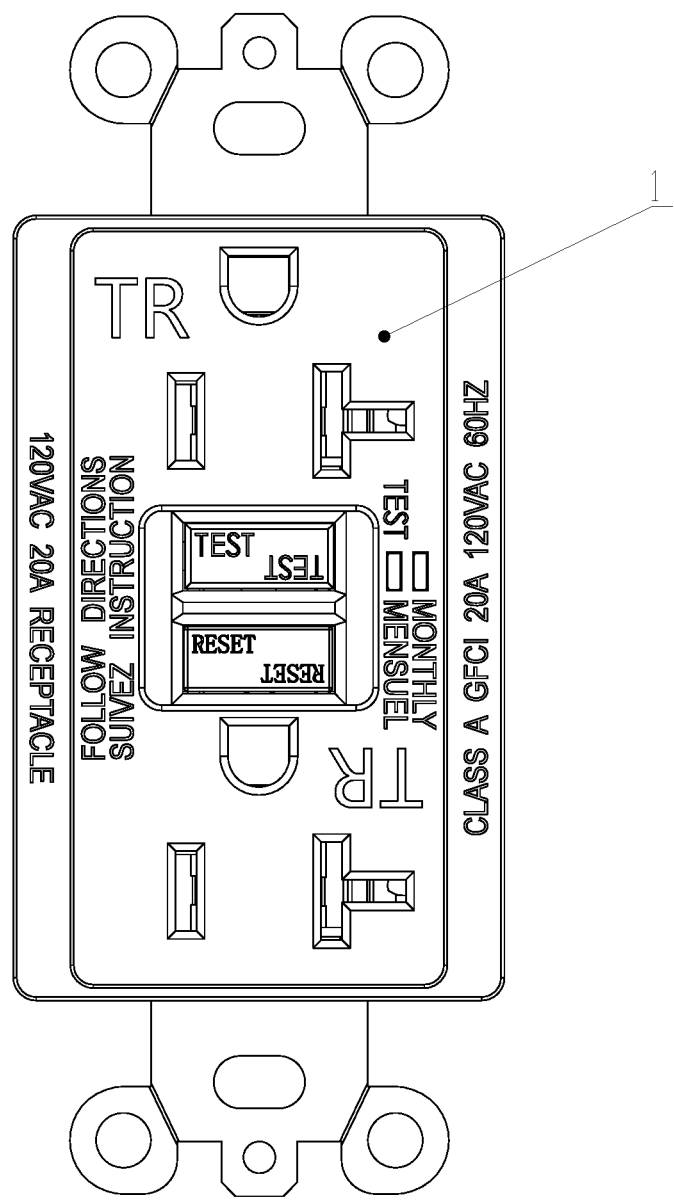
FIG. 1 is a vertical view according to Embodiment I of the present disclosure.
Figure 2:
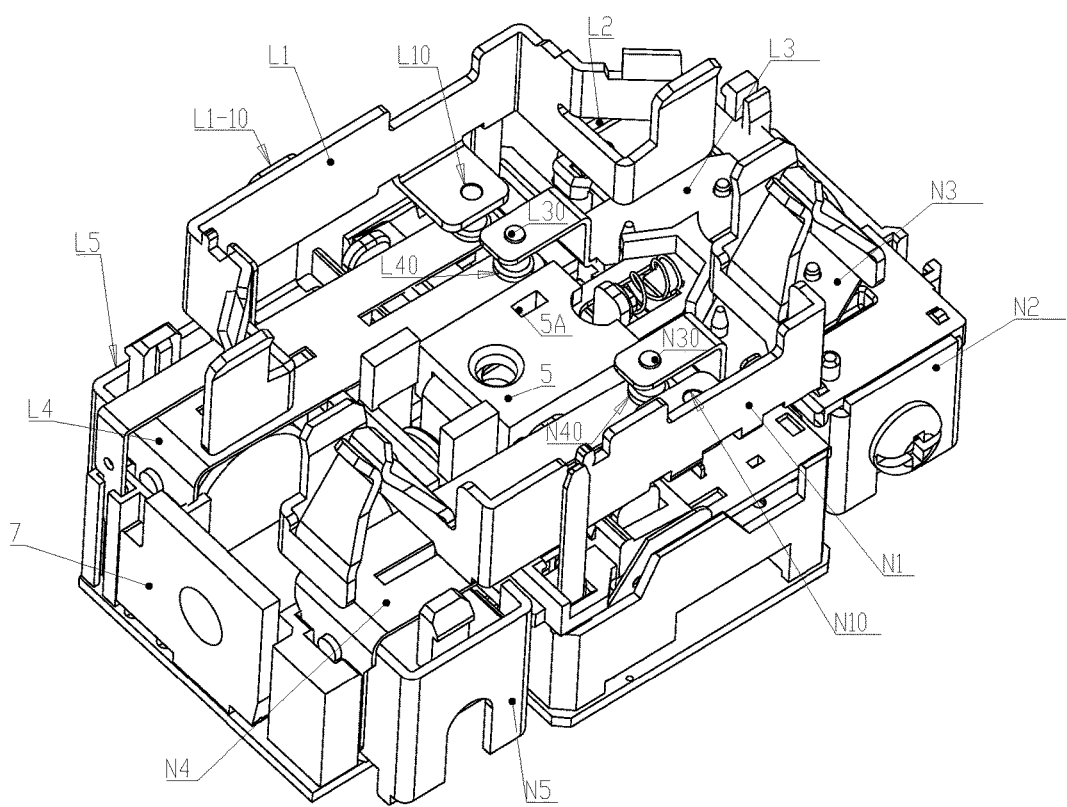
FIG. 2 is a schematic structural diagram of matching of a power input end, a power load end, an output conductor and a movable contact sheet of a main circuit switch.
Figure 3A:
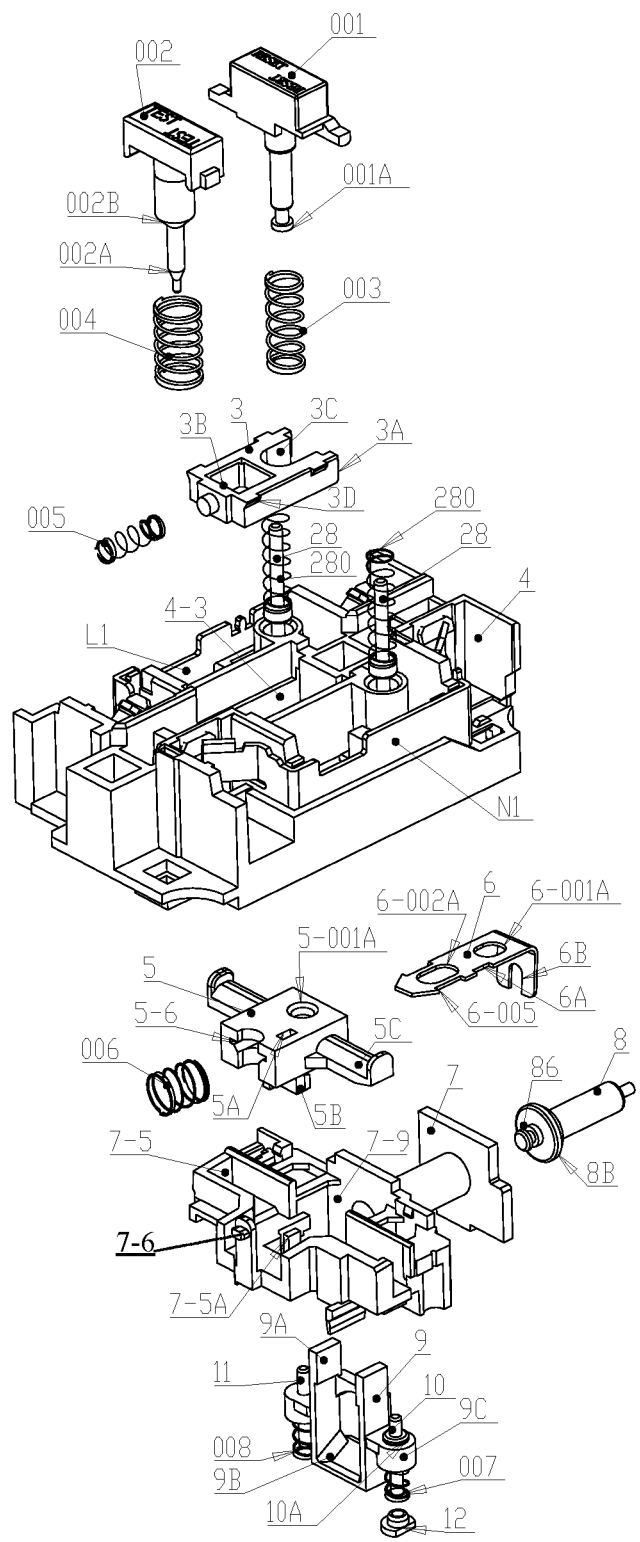
FIG. 3A is a schematic diagram of an internal structure according to Embodiment I.

As can be seen in FIG. 3A, the middle layer bracket 4 is provided with a slippage region 4-3 for the locking piece 3 to slip, and a slippage limiting mechanism is arranged between the middle layer bracket 4 and the locking piece 3 in the matching manner.

As can be seen in FIG. 3A, the locking piece 3 is provided with a notch 3C or a through hole through which a guide column of the reset button 001 and a reset button spring 003 penetrate. The elastic reset mechanism of the locking piece 3 includes a locking piece reset spring 005. The tail end of the locking piece 3 is provided with a spring positioning part for the locking piece reset spring 005 to sleeve and position, and the other end of the locking piece reset spring 005 abuts against a rectangular end in a slippage region 4-3 of the middle layer bracket 4.

The ground fault circuit interrupter with a reversed wiring protection function of the present disclosure further includes a test button 002. The locking piece 3 is provided with a through hole through which a guide column of the test button 002 penetrates. The guide column 002C of the test button 002 is provided with dual-stage drive sloping surfaces 002B and 002A. The through hole of the locking piece 3 is provided with an unlocking slope 3B used for being driven by the first-stage drive sloping surface 002B of the guide column 002C of the test button 002 to slip in when the lifting piece 9 is in a downward and locked state so as to unlock the lifting piece 9. The lock catch 6 is provided with a through hole 6-002A used for being driven by the second-stage drive sloping surface 002A of the guide column 002C of the test button 002 to slip and unlock lifting piece 9 so as to perform forced tripping.

An upper end surface of the middle layer bracket 4 is provided with a sunken slippage region 4-3. An outer side wall of the locking piece 3 is provided with a plurality of limiting protrusions 3D or the like. The middle layer bracket 4 is provided with engaging structures that receive the limiting protrusions to prevent removal of the locking piece 3. The limiting protrusions 3D of the locking piece 3 and the engaging structures of the middle layer bracket 4 are combined to form the slippage limiting mechanism.

The lock catch 6 penetrates through the tripper 5, which is installed on the skeleton of the trip coil 7. A U-shaped hole 6-002A is formed in the lock catch 6. An arc-shaped region of the U-shaped hole 6-002A is matched with the second-stage drive sloping surface 002A of the guide column 002C of the test button. A lock catch spring positioning part 6-005 is arranged on the side of the U-shaped hole through which the lock catch 6 penetrates the tripper 5. One end of the lock catch spring 006 abuts against the lock catch spring positioning part 6-005, and the other end of the lock catch spring 006 abuts against a positioning part 7-6 on the trip coil skeleton. A side edge of the lock catch 6 is provided with a limiting notch 6A, and the trip coil skeleton is provided with a limiting column 7-5A to engage with the limiting notch 6A of the lock catch.

A pair of auxiliary tripping devices 28 are further arranged above the movable contact sheets L4 and N4 of the main circuit switch. Each auxiliary tripping device 28 is provided with a limiting step and is sleeved with an auxiliary tripping spring 280. A lower end of the auxiliary tripping spring abuts against the limiting step of the auxiliary tripping device 28, and the other end of the auxiliary tripping spring 280 abuts against an inner side of an upper cover. The middle layer bracket 4 is provided with a pair of positioning through-hole 4H with a step, into which the auxiliary tripping devices 28 and the auxiliary tripping springs 28 are disposed, respectively.

Embodiment II

Figure 3B:
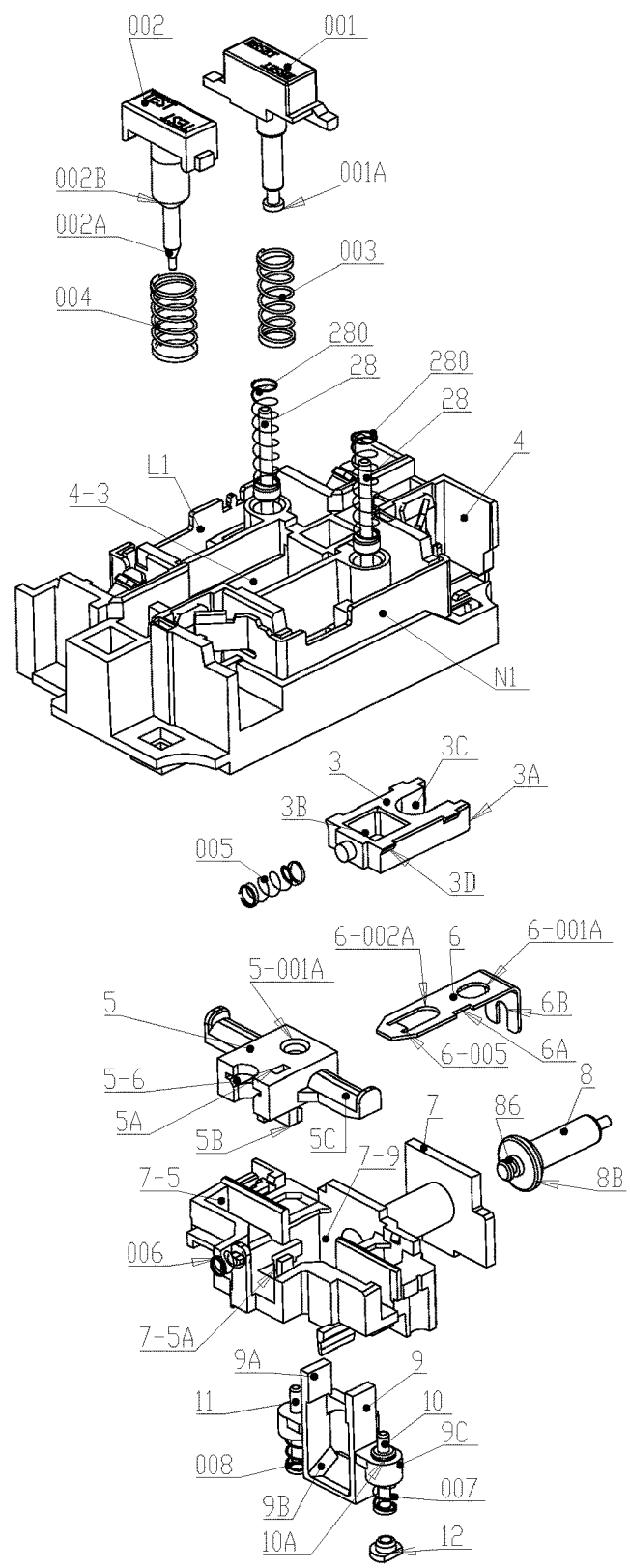
FIG. 3B is a schematic diagram of an internal structure according to Embodiment II.

Referring to FIG. 3B, a difference between this embodiment and Embodiment I is that a bottom of the middle layer bracket 4 is opened to form the slippage region into which the locking piece 3 is placed, and the middle layer bracket 4 is combined with the locking piece 3 through the limiting protrusions 3D or a buckling plate to form the slippage limiting mechanism. The remaining structures basically are the same as Embodiment I. The limiting protrusions 3D extending from two sides of the locking piece 3 form one piece with the locking piece 3.

Embodiment III

Figure 3C:
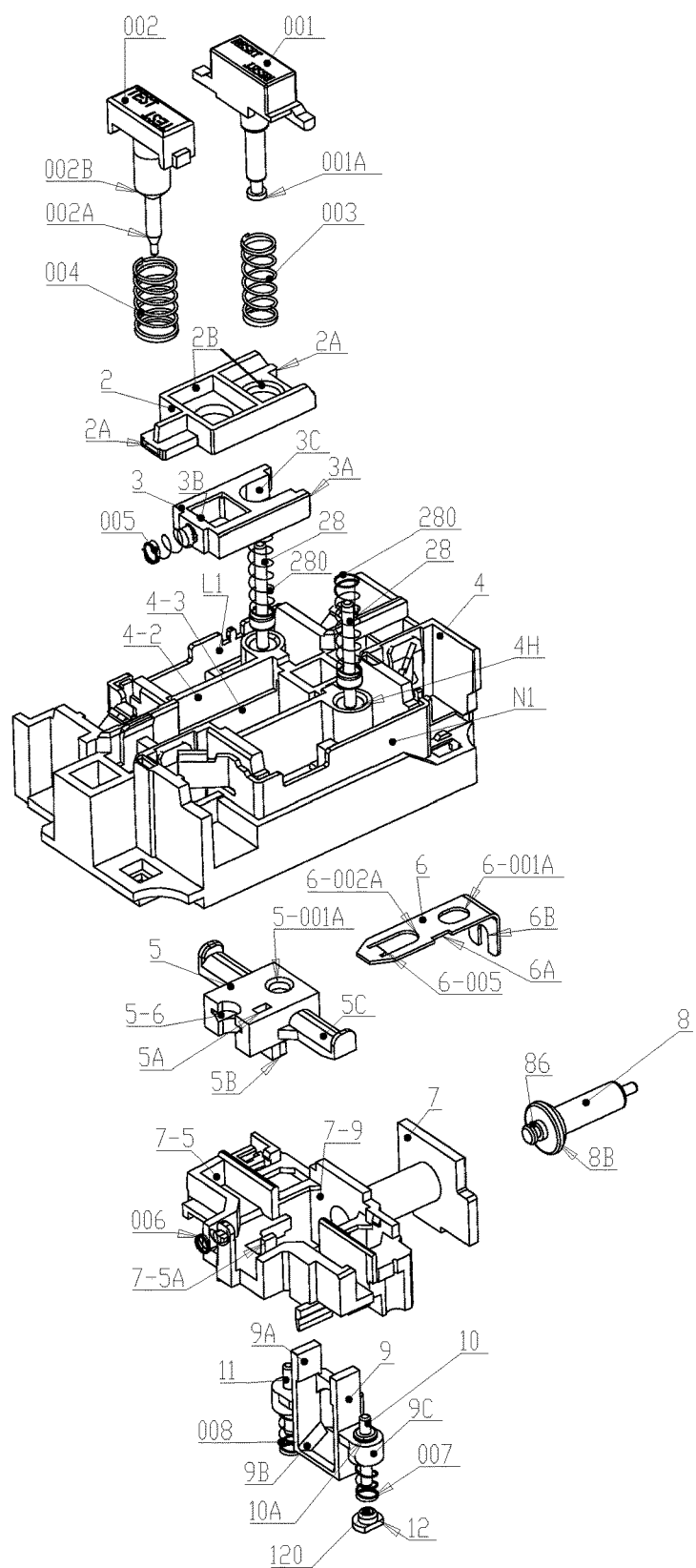
FIG. 3C is a schematic diagram of an internal structure according to Embodiment III.

Referring to FIG. 3C, the difference between this embodiment and Embodiment I resides in that a cover plate 2 is arranged above the locking piece 3. The cover plate 2 is provided with a set of through holes or notches through which the guide column of the reset button 001 and the guide column of the test button 002 penetrate. Positioning protrusions 2A at two ends of the cover plate 2 are configured to engage with the receiving portion of the middle layer bracket 4, and thereby align the cover plate 2 with respect to the middle layer bracket 4 to lock them in. The remaining structures basically are the same as Embodiment I.

Although the present disclosure has been illustrated and described with reference to preferred embodiments, those of ordinary skill in the art should understand that the present disclosure may be not limited to the description of the above embodiments, and may make various variations in form and in detail within the scope of the claims.

What is claimed is:

1. A ground fault circuit interrupter with a reversed wiring protection function, comprising:
   a main circuit switch;
   a middle layer bracket;
   a reset button;
   a trip coil;
   an electromagnetic trip mechanism;
   a lifting piece;
   a locking piece, the locking piece capable of vertically slipping relative to a lifting direction of the lifting piece; and
   an elastic reset mechanism disposed at a tail end of the locking piece,
   wherein:
      a first side and a second side of the lifting piece are sleeved upon a live line metal rods and a neutral line metal rod, respectively;
      a lower end of the live line metal rod is sleeved with a live line reset spring;
      a lower end of the neutral line metal rod is sleeved with a neutral line reset spring;
      in a correct wiring state, an upper end of the live line metal rod is in conductive contact with a live line movable metal sheet of the main circuit switch, the live line movable metal sheet extending from a power load end;
      in the correct wiring state, an upper end of the neutral line metal rod is in conductive contact with a neutral line movable metal sheet of the main circuit switch, the neutral line movable metal sheet extending from the power load end;
      the neutral line reset spring and a static metal sheet below the neutral line reset spring form a normally-closed reversed wiring path switch in a trip coil circuit;
      in the correct wiring state, a head of the locking piece abuts against a side wall of the lifting piece;
      the electromagnetic trip mechanism includes an iron core, a lock catch, and a tripper;
      the iron core is provided with a drive disc;
      the lifting piece is provided with a slope matched with the drive disc of the iron core;
      in a reversed wiring state, the iron core pulls the lifting piece to descend through the drive disc under the action of the magnetic field of the trip coil;
      in the reversed wiring state, the head of the locking piece covers a top of the lifting piece under the action of the elastic reset mechanism; and
      in the reversed wiring state, the live line metal rod is separated from the live line movable metal sheet and the neutral line metal rod is separated from the neutral line movable metal sheet to disconnect a trip coil path.

2. The ground fault circuit interrupter of claim 1, wherein further:
   a limiting boss radially extends from a position near an upper end of the live line metal rod;
   a transition metal sheet extends from an output conductor, the transition metal sheet includes a bending part extending beneath the live line movable metal sheet, the bending part of the transition metal sheet includes a bending part through hole through which the upper end of the live line metal rod penetrates;

the live line metal rod maintains conductive contact with an inner edge of the bending part through hole;

in the correct wiring state, the limiting boss abuts against a bottom of the bending part of the transition metal sheet; and in the reversed wiring state, the live line metal rod is in conductive contact with a static contact sheet led out from a live line end of a power input end.

3. The ground fault circuit interrupter of claim 2, wherein further:

an insulating seat is disposed on the static contact sheet led out from the live line end of the power input end;

the insulating seat is provided with an insulating seat through hole through which the live line metal rod penetrates, an upper end of the live line reset spring abuts against the limiting boss; and a lower end of the live line reset spring abuts against the insulating seat.

4. The ground fault circuit interrupter of claim 1, further comprising:

a slippage limiting mechanism disposed between the middle layer bracket and the locking piece, wherein further the middle layer bracket is provided with a slippage region for the locking piece to slip.

5. The ground fault circuit interrupter of claim 4, wherein further:

the locking piece includes a notch or a through hole through to accommodate penetration of a reset button guide column and a reset button spring;

the elastic reset mechanism includes a locking piece reset spring;

the tail end of the locking piece is provided with a spring positioning part for a first end of the locking piece reset spring to sleeve and position thereupon; and a second end of the locking piece reset spring abuts against the middle layer bracket.

6. The ground fault circuit interrupter of claim 5, further comprising:

a test button with a test button guide column, wherein:

the locking piece includes a test button through hole to accommodate penetration of the test button guide column;

the test button guide column is provided with a first-stage stage drive slope surface and a second-stage drive slope surface;

the test button through hole is provided with an unlocking slope configured to be driven by the first-stage drive slope surface to slip in when the lifting piece is in a downward and locked state so as to unlock the lifting piece; and the lock catch is provided with a lock catch through hole configured to be driven by the second-stage drive slope surface to slip and unlock the lifting piece so as to perform forced tripping.

7. The ground fault circuit interrupter of claim 6, further comprising a cover plate, wherein:

the cover plate is disposed above the locking piece;

the cover plate is provided with a first cover plate through hole or notch and a second cover plate through hole or notch to accommodate penetration of the reset button guide column and the test button guide column, respectively; and the cover plate is provided with positioning protrusions at first and second ends of the cover plate, the positioning protrusions being configured to engage with a receiving portion of the middle layer bracket to align and lock in the cover plate with respect to the middle layer bracket.

8. The ground fault circuit interrupter of claim 6, wherein further:

the lock catch penetrates through the tripper;

the trip coil has a trip coil skeleton with a positioning part;

the tripper is disposed on the trip coil skeleton;

a U-shaped hole is formed in the lock catch;

an arc-shaped region of the U-shaped hole is configured to engage with the second-stage drive slope surface of the test button guide column;

a lock catch spring positioning part is arranged on a side of the U-shaped hole through which the lock catch penetrates the tripper;

a first end of a lock catch spring abuts against the lock catch spring positioning part; and a second end of the lock catch spring abuts against the positioning part of the trip coil skeleton.

9. The ground fault circuit interrupter of claim 8, wherein further:

a side edge of the lock catch is provided with a limiting notch; and the trip coil skeleton is provided with a limiting column configured to engage with the limiting notch.

10. The ground fault circuit interrupter of claim 9, wherein further:

a pair of auxiliary tripping devices are disposed above the live line and neutral line movable contact sheets, respectively;

each of the pair of auxiliary tripping device is provided with a limiting step and is sleeved with an auxiliary tripping spring, a lower end of the auxiliary tripping springs abut against the limiting steps, respectively;

the middle layer bracket includes a pair of positioning through holes, each positioning through hole including a step; and the pair of auxiliary tripping devices and the auxiliary tripping springs are disposed into the pair of positioning through holes.

11. The ground fault circuit interrupter of claim 4, wherein further:

the slippage region is a sunken region provided on a top surface of the middle layer bracket;

an outer side wall of the locking piece is provided with a plurality of limiting protrusions;

the middle layer bracket includes engaging structures that receive the limiting protrusions to prevent removal of the locking piece; and the slippage limiting mechanism includes the limiting protrusions and the engaging structures.

12. The ground fault circuit interrupter of claim 4, wherein further:

the slippage region is an open region provided on a bottom surface of the middle layer bracket; and the slippage limiting mechanism includes at least one of limiting protrusions on the locking piece and a buckling plate.

\* \* \* \* \*